United States Patent [19]

Kitagawa

[11] 4,179,229
[45] Dec. 18, 1979

[54] MULTIPLE SPINDLE DRILLING MACHINE FOR WIDE FLANGE BEAMS

[75] Inventor: Toshikatsu Kitagawa, Seki, Japan

[73] Assignee: Miyakawa Industry Company Limited, Gifu, Japan

[21] Appl. No.: 861,550

[22] Filed: Dec. 19, 1977

[51] Int. Cl.² .................. B23B 41/00; B23B 39/18; B23B 39/22

[52] U.S. Cl. ............................. 408/39; 408/41; 408/52

[58] Field of Search ............ 408/37, 39, 40, 41, 408/42, 53, 52, 87, 88, 108, 109, 234, 69, 70, 103

[56] References Cited

U.S. PATENT DOCUMENTS

| | | | |
|---|---|---|---|
| 613,225 | 10/1898 | Pearson | 408/39 |
| 2,956,453 | 10/1960 | Frankenfield et al. | 408/70 X |
| 3,090,261 | 5/1963 | Hill | 408/70 X |
| 3,094,015 | 6/1963 | Mead | 408/50 X |
| 3,372,609 | 3/1968 | Wingne | 408/70 X |
| 3,507,025 | 4/1970 | Ankeney | 408/52 X |
| 3,561,001 | 2/1971 | Giuliani | 408/88 X |
| 3,687,563 | 8/1972 | McConnell | 408/39 |
| 3,977,804 | 8/1976 | Kitagawa | 408/39 X |
| 4,030,853 | 6/1977 | Mizen | 408/52 X |
| 4,090,803 | 5/1978 | Haley | 408/103 X |

Primary Examiner—Horace M. Culver
Attorney, Agent, or Firm—George B. Oujevolk

[57] ABSTRACT

A multiple spindle drilling machine for wide flange beams comprising a guide member vertically movably disposed on a gear box, drills disposed on the guide member in two upper and lower lines, said drills being arranged so that when they are moved and brought close to a wide flange beam together with the gear box, flanges of the wide flange beam are drilled, sensing means having the top end capable of bearing against the web surface of the wide flange beam and attached to a part of the guide member, and a centering device for vertically moving said sensing means together with the guide member and stopping said vertical movement when the sensing means bears against the web surface of the wide flange beam, so that the central position between the two lines of the drills is made in agreement with the central position of the thickness direction of the web of the wide flange beam.

9 Claims, 15 Drawing Figures

MULTIPLE SPINDLE DRILLING MACHINE FOR WIDE FLANGE BEAMS

BACKGROUND OF THE INVENTION

1. Field of the Invention

The present invention relates to a multiple spindle drilling machine for wide flange beams.

2. Description of the Prior Art

When flanges of a wide flange beam are drilled, in general, this drilling operation is not conducted based on both the ends of the flange portion with respect to the widthwise direction but based on the center of the thickness direction of the web portion, namely the web center. In short, the above drilling operation should be conducted while processing the flanges upper and lower parts based on the web center. Accordingly, in the conventional drilling techniques, the web center is located to determine drilling positions, or the processing positions are determined by calculating the dimensions of the upper and lower plates based on the lower end of the flange portion.

Such conventional positioning method, however, is defective in that determination of the processing positions is very troublesome and requires much labor.

OBJECTS OF THE INVENTION

It is a primary object of the present invention to provide a multiple spindle drilling machine for wide flange beams, according to which the flanges of a wide flange beam, the web center of the wide flange beam is easily determined and the flanges can be drilled while processing the flanges as upper and lower parts based on the web center.

Another object of the present invention is to provide a multiple spindle drilling machine for wide flange beams, according to which the web center of a wide flange beam can be readily determined irrespective of the thickness of the web of the wide flange beam.

Still another object of the present invention is to provide a multiple spindle drilling machine for wide flange beams, according to which upper and lower lines of drills are moved in the vertical direction so that the upper and lower lines of the drills can be operated while interlocked with each other, and the vertical positions of the upper and lower lines of the drills can optionally be set.

A further object of the present invention is to provide a multiple spindle drilling machine for wide flange beams, according to which the web center of a wide flange beam can easily be determined even if the web of the wide flange beam is not horizontal.

A still further object of the present invention is to provide a multiple spindle drilling machine for wide flange beams, according to which drill dusts formed on drilling of a wide flange beam can be discharged very easily.

A still further object of the present invention is to provide a multiple spindle drilling machine for wide flange beams, according to which both the flanges of a wide flange beam can be simultaneously drilled and in this case, drills located on the side of one flange can be moved integrally with a gear box and centering means.

A still further object of the present invention is to provide a multiple spindle drilling machine for wide flange beams, according to which moving strokes of drills can be diminished in the location where a wide flange beam is supported.

Other objects of the present invention will be apparent from embodiments illustrated hereinafter and be clearly set forth in the appended claims, and various advantages not specifically mentioned in the specification will be apparent to those skilled in the art when the present invention is carried into practice.

BRIEF DESCRIPTION OF THE DRAWING

FIG. 4-(a) is a partial side view illustrating the state of attachment of a left gear box to a guide member.

FIG. 4-(b) is a partial side view illustrating the state of attachment of a right gear box to a guide rail and a sliding member.

FIGS. 10-(a) and 10-(b) are partial front and back views showing the operation state of a device for adjusting the vertical positions of drills.

DETAILED DESCRIPTION OF THE PREFERRED EMBODIMENTS

The present invention will now be described in detail by reference to embodiments illustrated in the accompanying drawing.

Figure 3:
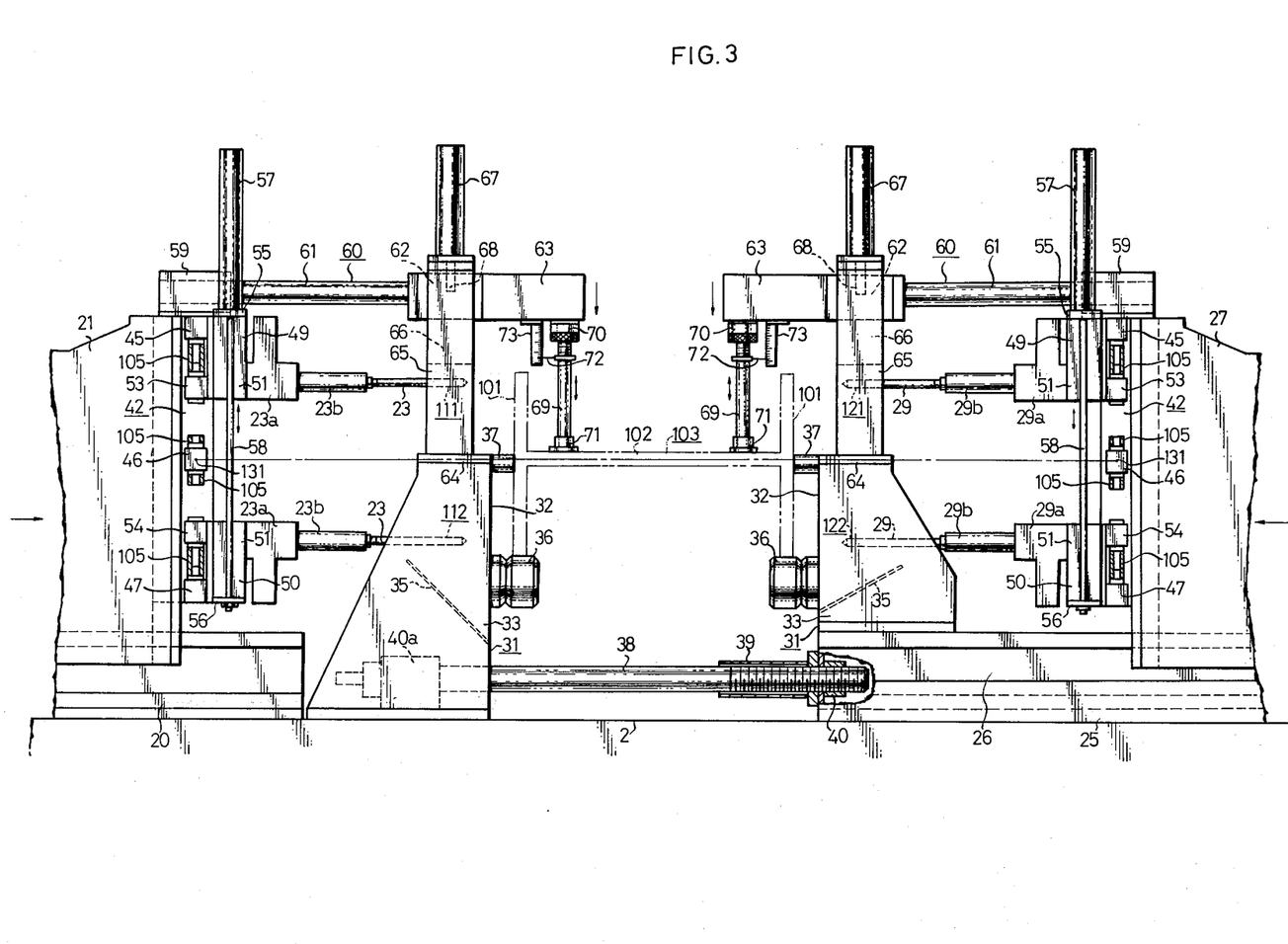
FIG. 3 is a front view showing the main portion of the drilling machine of the present invention shown in FIG. 1.

Reference numeral 1 represents a machine stand mounted on a bed 2, and a number of supporting rollers 4, each having a guiding bulged portion 3 projected on the outer periphery at the left end part, are freely rotatably attached to the top face of the machine stand 1. As shown in FIG. 3, a wide flange beam 103 comprising a pair of parallel flanges 101 and a web 102 connecting these flanges 101 at central parts thereof is supported in the horizontal state by these rollers 4.

An attachment frame 5 is vertically disposed on the right side of the machine stand 1 so that it can be moved to the left and right, and a guide roller 6 is vertically mounted on the attachment frame 5 freely rotatably so that the beam 103 on the rollers 4 can be guided cooperatively with the bulged portions of the rollers 4.

A supporting frame 7 including an upper frame portion 8 and a lower frame portion 9 is vertically disposed on the top face of the rear end portion of the bed 2. A passage hole 10 allowing passage of the wide flange beam 103 is formed to pierce the lower frame portion 9 in the front-rear direction, and a plurality of supporting rollers 11 are freely rotatably attached to the bottom face of said passage hole 10 on the same height as that of the supporting rollers 4. These supporting rollers 11 are not disposed in portions corresponding to drills 18 on the lower face of a vertical gear box 17 described hereinafter.

A gate-like attachment frame 12 is mounted on the front portion of the bed 2 to straddle the machine stand 1, and a pair of hydraulic cylinders 13 attached to the lower face of a lateral frame portion 14 of the attachment frame 12 and the lower frame portion 9 of the supporting frame 7, respectively, so that their positions can be adjusted in the left-right direction. A pressing member 15 is attached to the top end of the rod of each cylinder 13 to press and fix the central part of the top face of the web 102 of the wide flange beam 103.

A hydraulic cylinder 16 is attached to the upper portion of the front face of the upper frame portion 8 of the supporting frame 7 to vertically move the vertical gear box 17 mounted on the front face of the upper frame portion 8 of the supporting frame 7. A plurality of drills 18 are dismountably attached to the lower face of the rear portion of the gear box 17, so that their attachment position can be adjusted. Further, these drills 18 are arranged so that they are simultaneously driven and rotated through the vertical gear box 17 by a motor 19 fixed to the front face of the vertical gear box 17.

A moving device 104 is disposed on the front portion of the left side of the machine stand 1 to move the wide flange beam 103 in the front-rear direction.

Figure 4A:
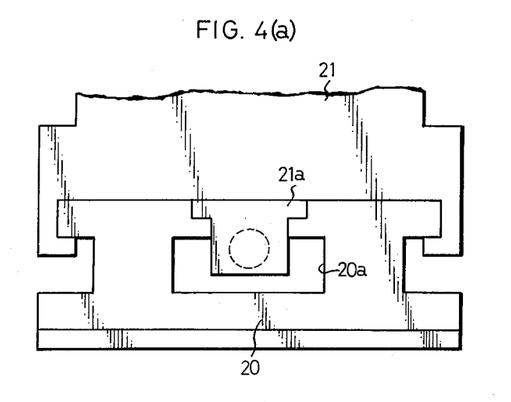

A guide member 20 extending in the left-right direction is attached to the upper left side of the bed 2 at a position corresponding to the position of the vertical gear box 17 attached to the upper frame portion 8. A groove 20a is formed on the top face of the guide member 20 to extend in the longitudinal direction, as shown in FIG. 4-(a). A left gear box 21 is mounted on the guide member 20 while an attachment portion 21a thereof is projected in the groove 20a, and it can be moved to the left and right along the guide member 20 by the rod of a hydraulic cylinder 22 fixed to the left end of the guide member 20.

A plurality of drills 23 arranged in upper and lower two rows 111 and 112 are mounted on the right side face of the gear box 21 so that their positions can be adjusted in both the vertical direction and the front-rear direction through a device for adjusting vertical positions of drills, described hereinafter, a holding member 23a and a drill-fitting spindle 23b and these drills 111 and 112 are simultaneously driven and rotated by a motor 24 fixed to the top face of the left gear box 21.

Figure 4B:
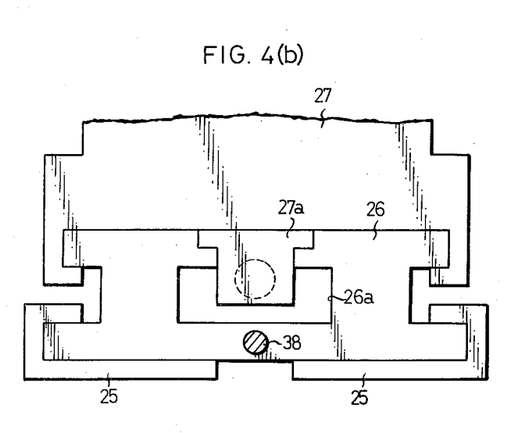

A pair of guide rails 25 extending in the left-right direction as well as the guide member 20 of the left gear box 21 are mounted on the upper right side of the bed 2 at a position corresponding to the position of the guide member 20 and each guide rail 25 supports thereon a slide member 26 having the same shape as that of the guide member 20 so that the slide member 26 can slide to the left and right. A groove 26a is formed on the top face of the slide member 26 to extend in the longitudinal direction, as shown in FIG. 4-(b). A right gear box 27 having an attachment portion 27a thereof projected from the lower face into the groove 26a is mounted on the slide member 26 so that it can be slid to the left and right with respect to the slide member 26 by the rod of a hydraulic cylinder 28 fixed to the right end of the slide member 26.

A plurality of drills 29 arranged in upper and lower two rows 121 and 122 are mounted on the left side face of the right gear box 27 so that their positions can be adjusted in both the vertical direction and the front-rear direction in correspondence to the above-mentioned drills 23 through a device for adjusting vertical positions of drills, described hereinafter, a holding member 29a and a drill-fitting spindle 29b. These drills 121 and 122 are simultaneously driven and rotated by a motor 30 fixed to the top face of the right gear box 27.

Figure 1:
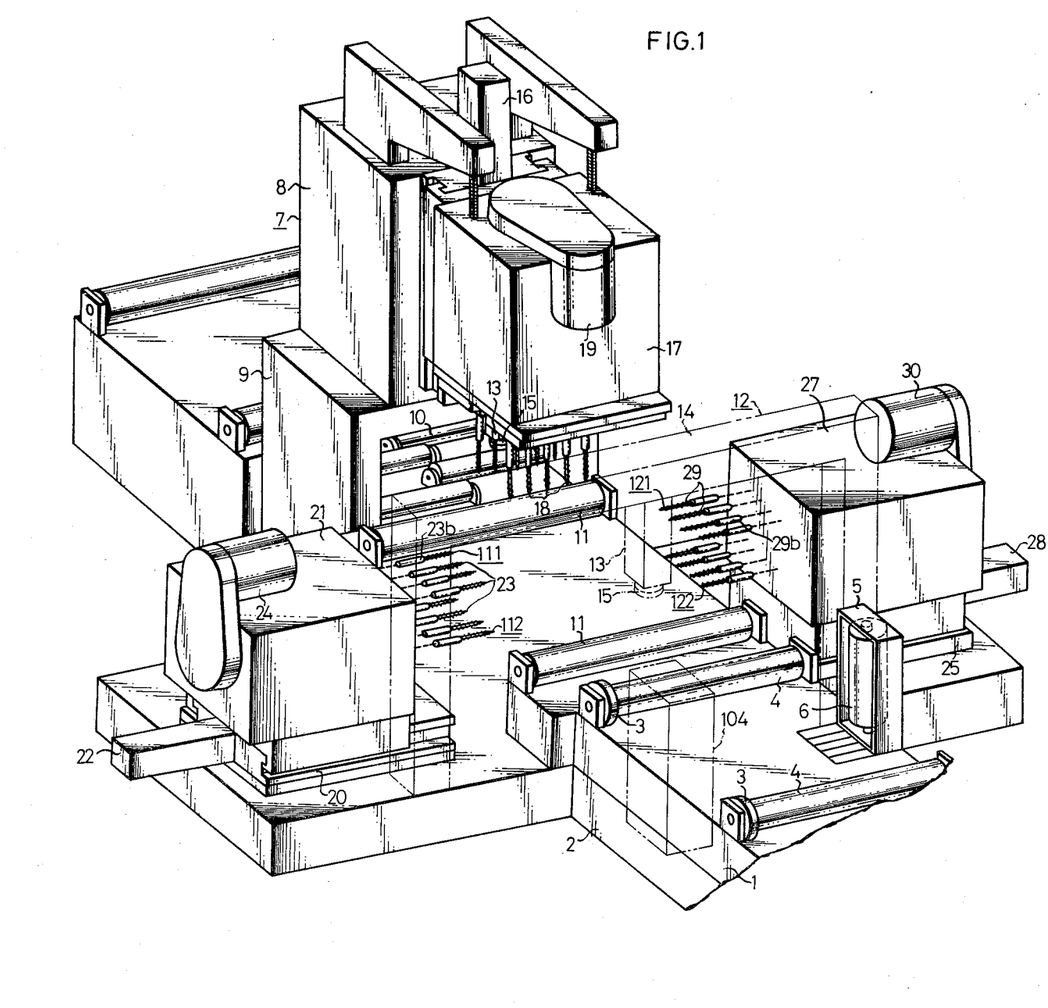
FIG. 1 is a partially cut-out perspective view showing a multiple spindle drilling machine for wide flange beams according to the present invention.
Figure 2:
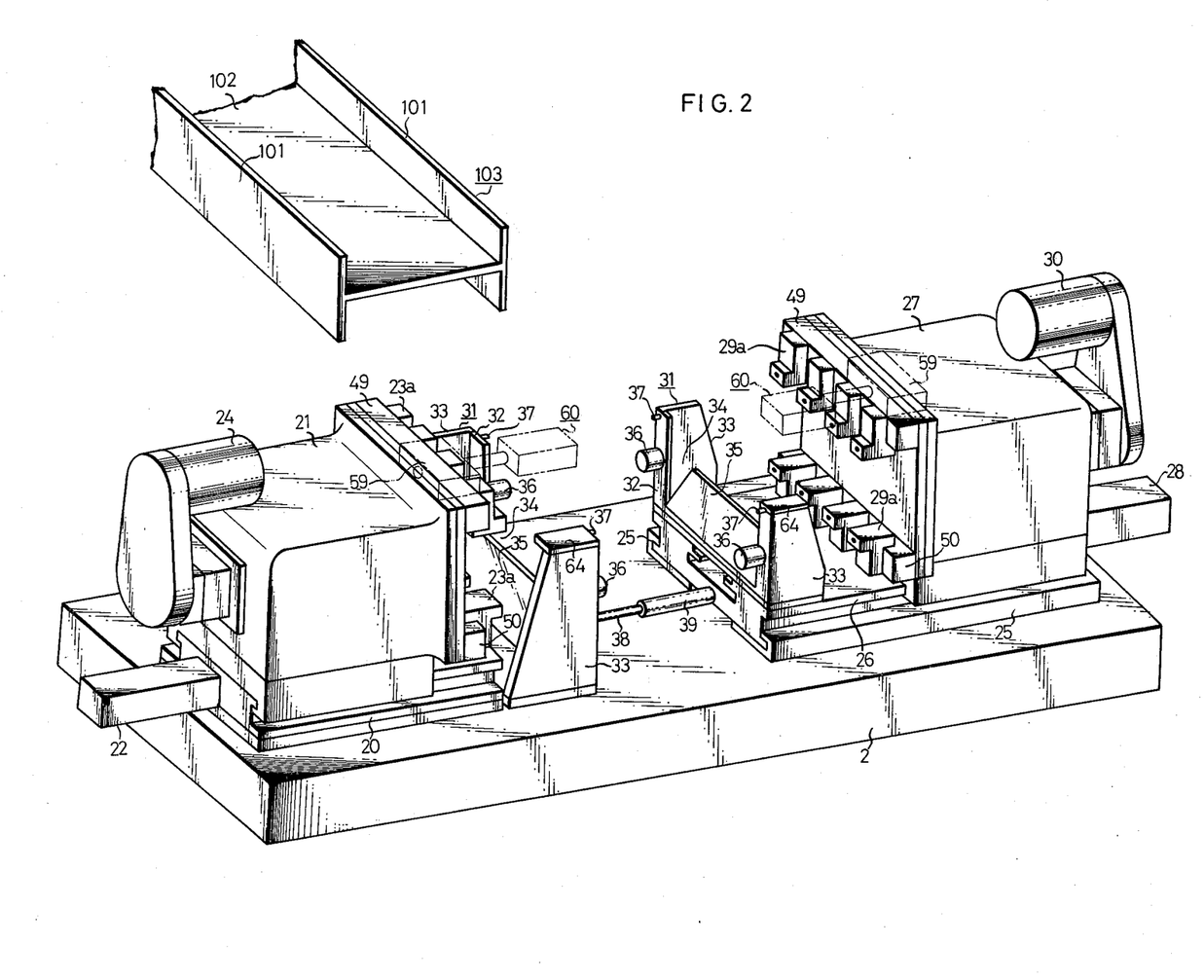
FIG. 2 is a partial perspective view showing the state of supporting a gear box on a bed in the drilling machine of the present invention shown in FIG. 1.

As shown in FIG. 2, a pair of gripping members 31 are vertically fixed on the top face of the bed 2 on the right side of the guide member 20 and on the top face of the left end of the slide member 26 so that they correspond to each other, and each gripping member 31 comprises a pair of front and rear side plates 33 and a pair of attachment plates 32. A notch 34 is formed from the upper portion in each attachment plate 32. Rightward and leftward lowering plates 35 for lowering drilling dusts are disposed on the lower portions of the notches 34 of the attachment plates 32, respectively. A distance between the pair of the side plates 33 of each gripping member 31 is slightly larger than the width between the frontmost and rearmost drills 23 on the right side of the left gear box 21 and the distance between the frontmost and rearmost drills 29 on the left side of the right gear box 27, and the positions of the top ends of the dripping plates 35 are slightly lower than the positions of the drills 23 and 29 in the lower rows.

As shown in FIGS. 2 and 3, cantilever supporting rollers 36 are freely rotatably mounted on the right side face and left side face of the attachment plates 32 located on both the front and rear sides of each notch 34, respectively, and the attachment positions of these supporting rollers 36 are on the same height as the above-mentioned delivery rollers 11 and supporting rollers 4 on the machine stand 1. A pressing projection 37 is disposed above each supporting roller 36 on the right or left side of the attachment plate 32 so that the vertical position thereof can be adjusted freely without any stage.

The base end of a screw lever 39 is rotatably supported on the bed 2 in the left gripping member 31 and the top end of the screw lever 38 is projected to the right and screwed into a nut 40 disposed in the interior of the slide member 26. This screw lever 38 is driven and rotated through a torque limiter by a motor 40a. Accordingly, when the screw lever 38 is rotated and screwed into the nut 40, the slide members 26 are moved to the left together with the gripping members 31 and supporting rollers 36 on the top faces of the slide members 26, and the wide flange beam 103 is fixed and gripped between both the left and right pressing projections 37. A protecting pipe 39 is capped on the screw portion of the screw lever 38 for protecting it from drilling dusts.

The operation of drilling the flanges 101 of the wide flange beam 103 by the multiple spindle drilling machine having the above structure will now be described.

The vertical positions of the pressing projections 37 of the respective gripping members 31 are adjusted according to the height of the flanges 101 of a wide flange beam 103, and the positions of the right supporting rollers 36 are adjusted in the left-right direction according to the width of the beam 103 (the length between both the flanges 101) so that a space slightly larger than the width of the beam 103 is formed. The adjustment of the positions of the supporting rollers 36 is accomplished by rotating the screw lever 38 and moving the slide member 26 to the left or right together with the right gripping member 31 along the guide rail 25. Then, the wide flange beam 103 is placed on the supporting rollers 4 and 36 and delivery rollers 11, and the screw lever 38 is turned and screwed into the nut 40 of the slide member 26, whereby the right supporting rollers 36 attached to the slide member 26 through the gripping members 31 are shifted to the left and the beam 103 is fixed and gripped between the pressing projections 37 in the space between both the gripping members 31.

At this point, also the right gear box 27 is moved to the left together with the slide member 26. When the right supporting rollers 36 are moved to the left, both the flanges 101 of the beam 103 is caused to slide on the supporting rollers 36.

Then, the hydraulic cylinders 22 and 28 attached to the guide member 20 and to the slide members 26 are operated while rotating drills 23 and 29, to move the left gear box 21 on the bed 2 to the right along the guide member 20 and move the right gear box 27 to the left along the slide member 26, whereby both the flanges 101 of the beam 103 are drilled by the drills 23 and 29.

Since the supporting rollers 36 corresponding to the drills 18, 23 and 29 are cantilever rollers, dust formed while drilling is not accumulated on the rollers 36 but falls on the bed 2, and therefore removal of drilling dust is easy. Further, since the supporting rollers 36, gripping member 31 and gear box 27 on the right side are moved integrally in the widthwise direction of the wide flange beam 103, when the wide flange beam 103 is placed on the supporting rollers 36 and gripped and fixed, it is unnecessary to move the supporting rollers 36, gripping member 31 and gear box 27 independently, and fixation of the wide flange beam 103 can be accomplished very easily and advantageously. Still further, since the supporting rollers 36 are supported by both the gripping members 31, moving means including screw levers 38 and nuts 40 can be used for both the supporting rollers 36 and the gripping members 31, and the moving strokes of the gripping members 31 to be moved after placing of the wide flange beam 103 on the supporting rollers 36 to grip the beam 103 and the moving strokes of the rows of drills can be diminished and the entire structure of the drilling machine can be made compact.

When other portions of the wide flange beam 103 are drilled, the beam 103 is shifted by the shifting device 104 and the above-mentioned operations are repeated.

Drilling of both the flanges 101 must be conducted in such a state that the flanges 101 are put into upper and lower parts symmetrically based on the web center of the wide flange beam 103. For this purpose, a centering device for determining the web center and a device for adjusting the vertical positions of the drills 23 and 29 are used in the present invention. These two devices will now be described by reference to FIGS. 3 to 9.

Figure 6:
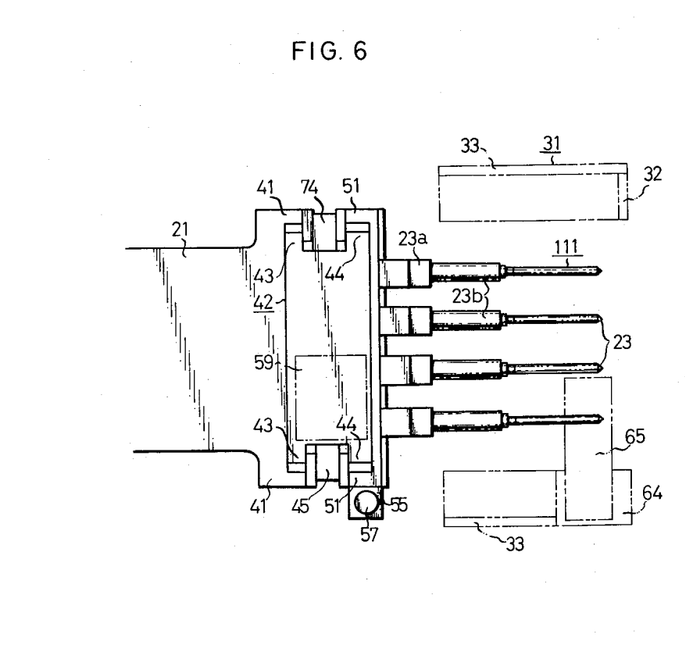
FIGS. 6 and 7 are partial plan and side views of the main portion shown in FIG. 3.

The structures of the vertical position adjustment device and centering device for the drills 23 and 29 on the left side are first described. As shown in FIG. 6, a dovetail portion 41 is formed on the right side of the left gear box 21 entirely along the vertical direction thereof, and front and rear parts of the dovetail portion 41 are paired and confront each other.

A hollow guide member 42 is mounted on the right side face of the left gear box 21, and a pair of guide projections 43 are formed on both the front and rear ends on the left side of the guide member 42 and are fitted in the front and rear parts of the dovetail portion 41 so that the projections 43 can slide in the vertical direction. A pair of guide projections 44 having the same shape as that of the guide projections 43 are formed on both the front and rear ends on the right side of the guide member 42.

As shown in FIG. 3, upper, intermediate and lower stoppers 45, 46 and 47 are fixed to the top end portion, central portion and lower end portion of the front side face of the guide member 42, respectively, between the guide projections 43 and 44. These stoppers are the same with respect to the shape and the vertical arrangement. Sleeve liners 105 are dismountably capped on the upper and lower ends of the intermediate stopper 46 and on the top end of the lower stopper 47. Both the sleeves 105 of the intermediate liner 46 are the same in the length.

Accordingly, all the stoppers 45 to 47 are arranged so that their vertical positions with respect to the left gear box 21 can be adjusted through the guide member 42.

Figure 5:
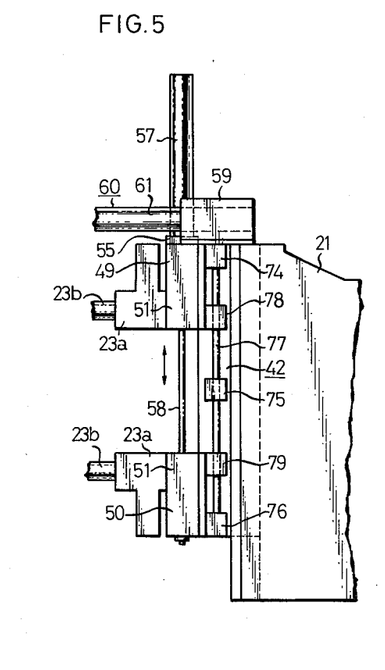
FIG. 5 is a partially cut-out back view of the main portion shown in FIG. 3.

As shown in FIG. 5, upper, intermediate and lower supporting pieces 74, 75 and 76 are fixed to the top end portion, central portion and lower end portion of the rear side face of the guide member 42, respectively, between the guide projections 43 and 44, and they correspond to the upper, intermediate and lower stoppers 45, 46 and 47, respectively, on the front side face of the guide member 42. A guide rod 77 is disposed in a line in the vertical direction among the supporting pieces 74, 75 and 76.

Accordingly, the guide rod 77 can be moved together with the guide member 42 in the vertical direction with respect to the left gear box 21.

Figure 7:
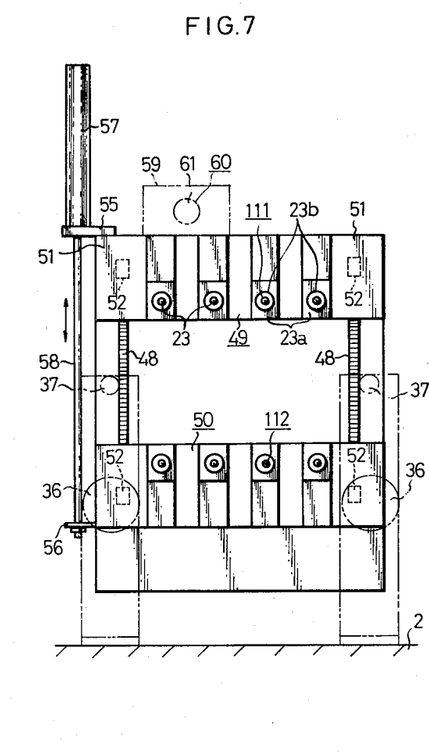

A pair of racks 48 are disposed on the front and rear part in the guide member 42 as shown in FIG. 7 and they are directed toward the drills 23. A pair of upper and lower movable members 49 and 50 are attached to the right side face of the guide member 42, and as shown in FIG. 6, a pair of slide members 51 disposed on both the front and rear ends of each of the movable members 49 and 50 are vertically movably fitted on the guide projections 44 on the right side of the guide member 42. Further, a pair of pinion gears 52 are disposed in each of the upper and lower movable members 49 and 50 so that they can be engaged with the racks 48. By this arrangement, when the respective movable members 49 and 50 are vertically moved, their vertical movements are made synchronous with each other at both the front and rear ends thereof.

The holding members 23a for fixing the drills 23 are attached to the right side face of each of the upper and lower movable members 49 and 50 so that the front-rear positions of the holding members 23a can be adjusted.

As shown in FIG. 3, an upper movable stopper 53 is projected on the left side of the lower end of the slide member 51 on the front portion of the upper movable member 49 to correspond to the upper and intermediate stopper 45 and 46 of the guide member 42. A lower movable stopper 54 similar to the upper movable stopper 53 is projected on the left side of the upper end of the slide member 51 on the front portion of the lower movable member 50 to correspond to the intermediate and lower stoppers 46 and 47 of the guide member 42.

Each of the upper and lower movable stoppers 53 and 54 has the same shape as that of the foregoing three stoppers 45 to 47. A sleeve liner 105 having the same length as that of the sleeve liner 105 of the lower stopper 47 is dismountably attached to the upper end of the upper movable stopper 53. The upper movable stopper 53 is located in the midway between the upper stopper 45 and intermediate stopper 46 of the guide member 42, and the lower movable stopper 54 is located in the midway between the intermediate stopper 46 and lower stopper 47 of the guide member 42. The distance between the lower end of the upper movable stopper 53 and the upper end of the intermediate stopper 46 is made equal to the distance between the upper end of the lower movable stopper 54 and the lower end of the intermediate stopper 46.

Accordingly, the central position 131 of the intermediate stopper 46 with respect to the vertical direction coincides with the center between both the upper and lower rows 111 and 112 of the drills.

As shown in FIG. 5, an upper slide piece 78 is projected on the left side of the lower end of the slide member 51 on the rear portion of the upper movable member 49 and the guide rod 77 is fitted and inserted in the upper slide piece 78 between the upper and intermediate supporting pieces 74 and 75 of the guide member 42 so that the guide rod 77 can be vertically slid. A lower slide piece 79 similar to the upper slide piece 78 is projected on the left side of the top end of the slide member 51 on the rear portion of the lower movable member 50 and the guide rod 77 is fitted and inserted in the lower slide piece 79 between the intermediate and lower supporting pieces 75 and 76 of the guide member 42 so that the guide rod 77 can be vertically slid.

Accordingly, when the upper and lower movable members 49 and 50 are vertically moved along the guide member 42, also the upper and lower slide pieces 78 and 79 are simultaneously moved integrally in the vertical direction while being guided by the guide rod 77.

As shown in FIGS. 3 and 7, corresponding brackets 55 and 56 are projected forwardly on the upper end of the upper movable member 49 and the lower end of the lower movable member 50, respectively. A hydraulic cylinder 57 is vertically disposed on the bracket 55 of the upper movable member 49 and the lower end of a rod 58 of the hydraulic cylinder 57 is fixed to the other bracket 56. Accordingly, when the rod 58 of the hydraulic cylinder 57 is contracted, both the movable members 49 and 50 are brought close to each other along the guide member 52, and when the rod 58 of the hydraulic cylinder 57 is elongated, both the movable members 49 and 50 are separated from each other.

Figure 8:
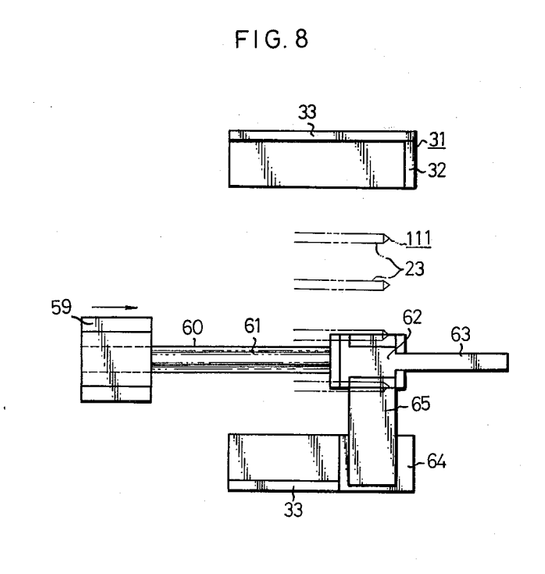
FIGS. 8 and 9 are partially cut-out plan and side views of the main portion shown in FIG. 3.

As especially shown in FIGS. 6 and 7, a supporting stand 59 is fixed to the top face of the front portion of the guide member 42 and a connecting member 60 is supported by this supporting stand 59. As shown in FIGS. 3 and 8, this connecting member 60 extends in the left-right direction, and it comprises a columnar connecting portion 61 located in the left half, an angular slide portion 62 contiguous to the columnar connecting portion 61 on the right side thereof, and a plate-like supporting portion 63. The connecting portion 61 is inserted into the interior of the supporting stand 59 so that it can be moved in the left-right direction.

The side portion 62 of the connecting member 60 is located above between the drill 23 located on the front end and the subsequent drill 23, and with respect to the left-right direction, the slide portion 62 corresponds to the top end of the side plate 33 of the left gripping member 31. The right end of the supporting portion 63 of the connecting member 60 is located slightly rightwardly of the left gripping member 31.

Figure 9:
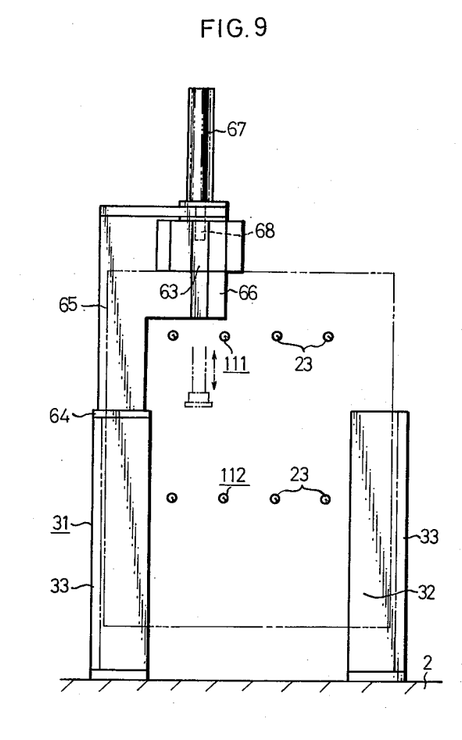

As shown in FIGS. 8 and 9, a base plate 64 is attached onto the side plate 33 and attachment plate 32 located on the front side of the left gripping member 31, and a fixed stand 65 is vertically disposed on the base plate 64 so that the top end of the fixed stand 65 is extended backwardly. The slide portion 62 of the connecting member 60 is vertically movably supported by a supporting portion 66 and the top end of the fixed stand 65.

As shown in FIGS. 3 and 9, a hydraulic cylinder 67 is vertically disposed on the top face of the supporting portion 66 of the fixed stand 65, and the lower end of a rod 68 of the cylinder 67 is fixed to the slide portion 62 of the connecting member 60. Accordingly, when the rod 68 of the hydraulic cylinder 67 is vertically moved, the connecting member 60 and the guide member 42 through the supporting stand 59 are vertically moved.

As shown in FIG. 3, a sensing rod 69 is attached to the lower face of the right end of the supporting portion 63 of the connecting member 60 so that the vertical position of the sensing rod 69 can be slightly adjusted by a holder 70. A contact member 71 is fixed to the lower end of the sensing rod 69. The position of the contact member 71 is set so that the position of the lower face of the contact member 71 is higher by ½ of the thickness of a web 102 of a wide flange beam 103 to be drilled than the central position of the intermediate stopper 46 of the guide member 42 with respect to the vertical direction, namely the position of the central line between the upper and lower drill rows 111 and 112. As shown in FIG. 3, the contact member 71 of the sensing rod 69 bears against the top face of the web 102 at a position near the left flange 101 of the beam 103, and the contact member 71 has a function also as a pressing member for pressing and fixing the beam 103 to the supporting rollers 36 and the like at the drilling operation.

An indicator 72 is attached to the upper portion of the sensing rod 69 so that it is projected to the left and it can be vertically moved integrally with the sensing rod 69. A gauge 73 is vertically movably attached to the lower face of the supporting portion 63 of the connecting member 60 in the left of the sensing rod 69, and the vertical position of the sensing rod 69 can be read from the indicator 72.

Another centering device and vertical drill position adjustment device having the same structures as the above-mentioned structures are disposed on the left side face of the right box 27 and the right gripping member 31 as shown in FIG. 3 symmetrically with the above-mentioned centering and adjustment devices.

The operations of setting the web center of a wide flange beam 103 by using the above-mentioned centering and adjustment devices and drilling flanges 101 of the beam 103 at appropriate positions will now be described.

In the state where a pair of the sensing rods 69 are upwardly shifted together with the connecting members 60, the guide members 42 and the like so that the contact members 71 on the lower ends of the sensing rods 69 are separated from the upper face of the web 102 of the wide flange beam 103, the lower faces of the left and right contact members 71 are set at positions higher by ½ of the thickness of the web 102 of the beam 103 than the central positions 131 of the intermediate stoppers 46 of the guide members 42 co-operatively interconnected with said contact members 71 with respect to the vertical direction. The operation of this position on adjustment can be accomplished by reading the position of the indicator 72 on the upper portion of each sensing rod 69 from the gauge 73.

When the lower face position of each contact member 71 is thus determined, the central positions 131 of the left and right intermediate stoppers 46 come to coincide with the central line between the upper and lower drill rows 111 and 112 and the central line below the upper and lower drill rows 121 and 122, respectively. As a result, the lower faces of the respective contact members 71 are located at the positions higher by ½ of the thickness of the web 102 of the beam 103 than the central line positions between the drill rows 111 and 112 and between the drill rows 121 and 122.

Then, the hydraulic cylinders 67 on a pair of the gripping members 31 are operated to bring down the rods 68 thereof, whereby a pair of the connecting members 60 having the slide portions 62 thereof fixed to the rods 68 are brought down along the supporting portions 66 of the fixed stands 65. Simultaneously, the sensing rods 69 attached to the supporting portions 63 of the connecting members 60 are brought down, and the guide members 42 attached to the connecting portions 61 of the connecting members 60 through the supporting stands 59 are integrally moved downwardly along the dovetail portions 41 of the left and right gear boxes 21 and 27. Accordingly, the stoppers 45 to 47, hydraulic cylinders 57, movable members 49 and 50 and drill rows 111, 112, 121 and 122 attached to the guide members 42 are simultaneously moved downwardly integrally with the guide members 42.

When the sensing rods 69 are moved downwardly, the contact members 71 on the lower ends thereof bear against the top face of the web 102 of the wide flange beam 103, and at this point, the operations of the hydraulic cylinders 67 are stopped. In this state, the web center of the beam 103 is located on the central line between the upper drill rows 111 and 121 and the lower drill rows 112 and 122. Namely, the lower faces of the contact members 71 of the sensing rods 69 are set at positions higher by ½ of the thickness of the web 102 of the beam 103 than the position of said central line between the upper drill rows 111 and 121 and the lower drill rows 112 and 122. Accordingly, when the contact members 71 bear against the upper face of the web 102, the central line between the upper drill rows 111 and 121 and the lower drill rows 112 and 122 is at a position lower by ½ of the thickness of the web 102 than the position of the upper face of the web 102, namely at the same position as that of the web center.

When the operation of centering the web 102 of the wide flange beam 103 has thus been completed, the hydraulic cylinders 57 attached to the guide members 42 are operated to move the rods 58 thereof upwardly or downwardly.

Figure 10:
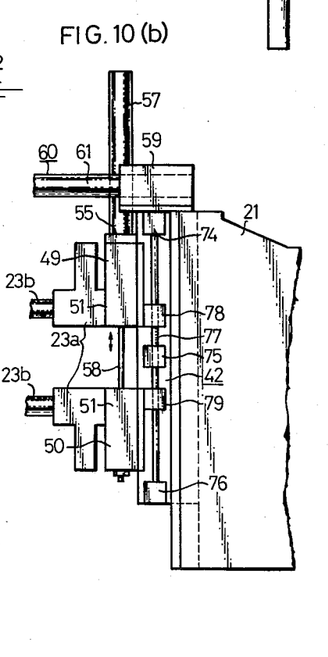
Figure 10A:
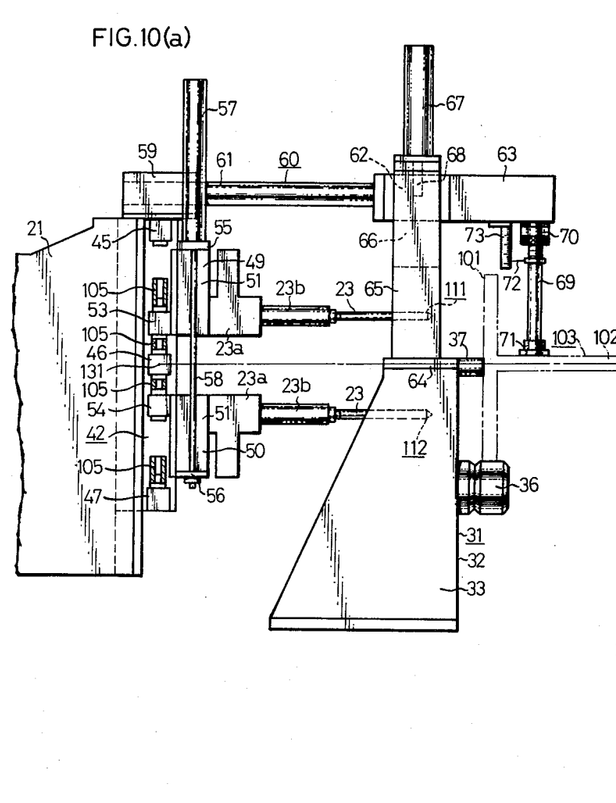

When the rods 58 are moved upwardly, as shown in FIGS. 10(a) and 10(b), the lower movable members 50 attached to the lower ends of the rods 58 are first moved upwardly along the guide members 42, and then, the lower movable stoppers 54 of the lower movable members 50 bear against the intermediate stoppers 46 of the guide members 42. At this point, the cylinders 57 per se are moved downwardly, and hence, the upper movable members 49 attached to the cylinders 57 begin the downward movement. When the upper movable stoppers 53 of the upper movable members 49 bear against the intermediate stoppers 46 of the guide members 42, both the movable members 49 and 50 are stopped.

In this state, when the rods 58 are moved downwardly, the lower movable members 50 attached to the lower ends of the rods 58 are first moved downwardly and the lower movable stoppers 54 of the movable members 50 bear against the lower stoppers 47 of the guide members 42. At this point, the hydraulic cylinders 57 are moved upwardly and the upper movable members 49 begin the upward movement together with the cylinders 57. When the upper movable stoppers 53 of the upper movable members 49 bear against the upper stoppers 45 of the guide members 42, both the movable members 49 and 50 are stopped (see FIG. 3).

When both the upper and lower movable members 49 and 50 are moved upwardly or downwardly, the slide pieces 78 and 79 on the rear portions thereof are vertically moved along the guide rod 77 [see FIG. 10—(b)] and pairs of the pinion gears 52 built in the movable members 49 and 50 are engaged with a pair of the racks 48 mounted on the guide member 42 and rotated integrally therewith. Accordingly, both the movable members 49 and 50 are moved so that the movements of both the front and rear ends of both the movable members 49 and 50 are synchronous with each other and ends of one movable member are not inclined downwardly or upwardly.

When both the upper and lower movable members 49 and 50 are vertically moved in the above-mentioned manner, the drills of the upper rows 111 and 121 and the lower rows 112 and 122 are moved in a direction coming close to each other or separating from each other, and when the vertical movement of the movable members 49 and 50 is completed, these drills of the upper rows 111 and 121 and the lower rows 112 and 122 are located symmetrically with each other with the web center of the wide flange beam 103 being as the center of the symmetry.

When both the upper and lower drill rows are brought close to each other, the space between the upper and lower drill rows is adjusted by adjusting the length of the two sleeve liners 105 attached to the intermediate stopper 46 of the guide member 42, and when they are spaced from each other, the distance between the upper and lower drill rows is adjusted by adjusting the length of the sleeve liner 105 attached to the upper movable stopper 53 of the upper movable member 49 and the length of the sleeve liner 105 attached to the lower stopper 47 of the guide member 42.

Figure 11:
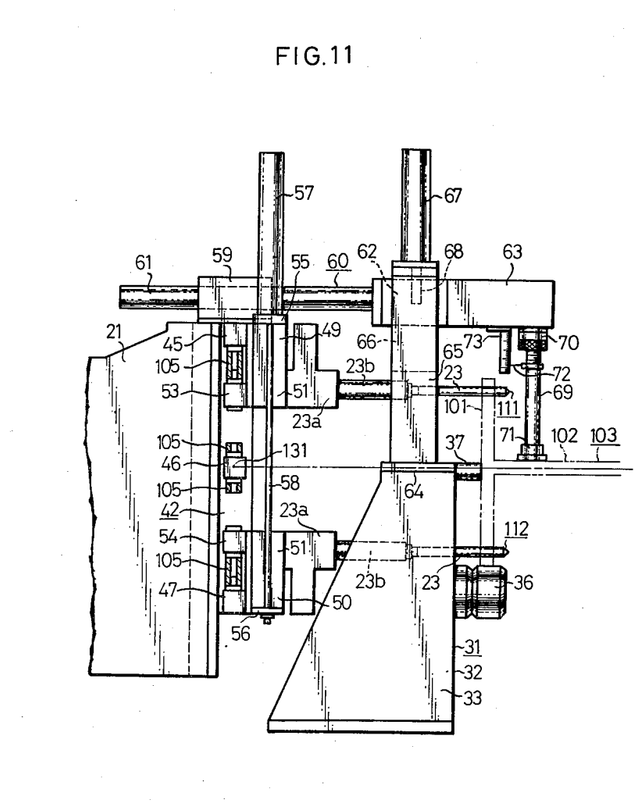
FIG. 11 is a partial front view illustrating the state of drilling a wide flange beam.
Figure 12:
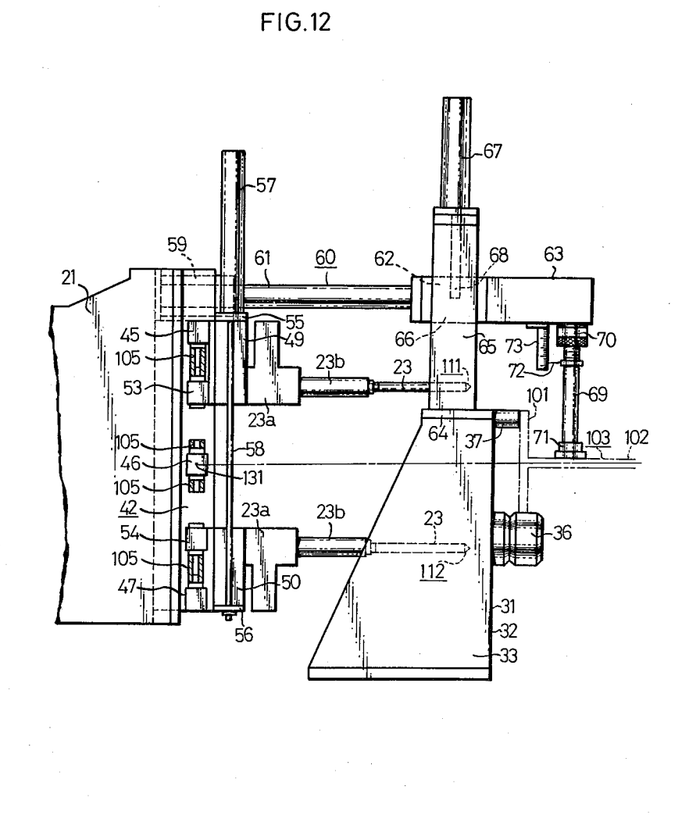
FIG. 12 is a partial front view illustrating the state of centering a wide flange beam having a low height.

When the drills of both the upper and lower rows are thus moved symmetrically with respect to the web center of the wide flange beam 103 and their positions are set, both the left and right gear boxes 21 and 27 are advanced, as shown in FIG. 11, so that they are brought close to each other, whereby the drills of the upper rows 111 and 121 and the lower rows 112 and 122 on both the left and right sides make drilling processing on both the left and right flanges 101 of the beam 103. In this case, the drilling positions are symmetrical with respect to the vertical direction wit the web center of the beam 103 being as the center of symmetry.

When both the left and right gear boxes 21 and 27 ae shifted, the supporting stands 59, the hydraulic cylinders 57 and other members on the top faces of the gear boxes 21 and 27 are simultaneously moved through the guide members 42, but the connecting members 60 are not moved in the left-right direction because the connecting portions 61 thereof slide in the supporting stands 59 and project to the left or right.

Figure 13:
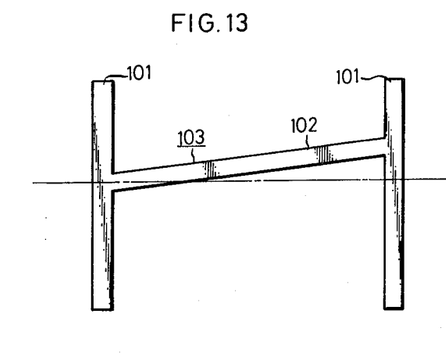
FIG. 13 is a front view illustrating the front view of a wide flange beam in which the web is not horizontal.

When a pair of the centering device and vertical drill position adjustment device are disposed on each of the left and right sides of the wide flange beam 103 as in the foregoing embodiment, the foregoing devices can be separately operated on each side. Accordingly, even if the web 102 of the wide flange beam 103 is not horizontal with respect to the left-right direction as shown in FIG. 13, the central positions of the web 102 on both the left and right ends thereof can easily be found out by the paired centering and vertical drill position adjustment devices on the left side and those on the right side, respectively, and therefore, the drilling operation can be performed very easily. Further, when each sensing rod 69 is located on the side near the flange 101 above the web 102 of the beam 103 as in the foregoing embodiment, the position of the web center on either left or right side face of the flange 101 can be determined more precisely.

In the foregoing embodiment, when the position of the lower face of the contact member 71 of the sensing rod 69, the position of the indicator 72 in the upper portion of the sensing rod 69 is read from the gauge 73. Alternately, a liner having a length corresponding to ½ of the thickness of the web 102 of the wide flange beam 103 to be drilled may be fitted to the lower end of the sensing rod 69 to set the position of the lower face of the contact member 71.

Further, the three stoppers 45 to 47 attached to the guide member 42 may be arranged so that their vertical positions can be adjusted with respect to the guide member 42.

Still further, in the foregoing embodiment, only the right gripping member 31 and gear box 27 are arranged so that they can be moved to the left and right. Alternately, the left gripping member 31 and gear box 21 may be movably arranged, or the supporting rollers 36 may be attached through members other than the gripping members 31. As means for moving the slide member 26, there may be used a cylinder device instead of the screw lever 38 and nut 40, and the motor and torque limitter for rotating the screw lever 38 may be changed to a torque motor.

The present invention has been described in detail by reference to the most preferred embodiment, but as will be apparent to those skilled in the art, various changes and modifications can be made without departing from the spirit and scope of the invention as defined in the appended claims, and the present invention is not limited by specific embodiments except those specified in the appended claims.

What is claimed is:

1. A multiple spindle drilling machine having a frame for receiving wide flange beams at a work station, comprising in combination:
   (a) guide members vertically movable and vertically disposed on a pair of gear boxes (21,27) at said work station;
   (b) horizontal drills disposed on each guide member in two upper and lower rows (111, 112, 121, 122), so arranged and disposed that when they are moved and brought close to a wide flange beam at said work station together with said gear boxes, both flanges of the wide flange beam are drilled;
   (c) at least one pair of gripping members (31) mounted on inner side faces of each gear box to grip and immovably fix a wide flange beam from both sides (101) thereof at said work station previous to the drilling operation;
   (d) sensing means (69) having a lower end (71) and a top end and being capable of bearing against a web surface of a wide flange beam, said sensing means (69) being attached to a part of each guide member;
   (e) a centering device for vertically moving said sensing means (69) together with the guide member and stopping said vertical movement when the sensing means bears against the web surface of the wide flange beam so that the central position between the two rows of the drills is made to agree with the center of the thickness of the web of the wide flange beam, said centering device including, a fixed stand (59) fixed to at least one of said gripping members, and a connecting member (60) with inner and outer end portions vertically suported and vertically movable on said fixed stand, said sensing means being attached to said connecting member inner end portion, said connecting member outer end portion being connected to said guide member; and,
   (f) a cylinder device (62) mounted on said fixed stand to move said connecting member in the vertical direction so that said sensing means is moved downwards through said connecting member by said cylinder device so that the lower end of said sensing means bears against the upper face of the web of the wide flange beam.

2. A multiple spindle drilling machine for wide flange beams as set forth in claim 1 wherein said sensing means is attached to said connecting member so that the vertical position of said sensing means can be adjusted and the lower end face of said sensing means can be located at a position higher by ½ of the thickness of the web of the wide flange beam than the central position between the upper and lower drill rows with respect to the vertical direction.

3. A multiple spindle drilling machine for wide flange beams as set forth in claim 1 wherein the outer end portion of said connecting member is connected onto said guide member through the supporting stand so that said connecting member can be moved in the widthwise direction of the wide flange beam and even when the gear box is shifted toward the wide flange beam for drilling, said connecting member and sensing means are not moved in said direction of the movement of the gear box.

4. A multiple spindle drilling machine for wide flange beams as set forth in claim 1 wherein drill position adjustment means is disposed to move the upper and lower rows of the drills in the vertical direction with respect to the guide member while making the movement of the drills of the upper row synchronous with the movement of the drills of the lower row, so that the drills of each drill row can be moved in the vertical direction according to the height of the flanges of the wide flange beam.

5. A multiple spindle drilling machine for wide flange beams as set forth in claim 4 wherein the drills of the upper and lower rows are attached to the guide member through a pair of upper and lower movable members, said drill position adjustment means is at least one hydraulic cylinder attached onto said upper movable member, and the lower end of a rod of said hydraulic cylinder is connected to said lower movable member.

6. A multiple spindle drilling machine for wide flange beams as set forth in claim 5 wherein stoppers for regulating the vertical movements of the upper and lower movable members are disposed on both the upper and lower end portions of said guide member so that the stoppers are located above the upper movable member and below the lower movable member, respectively, and another stopper is disposed substantially at the center of said guide member with respect to the vertical direction so that said stopper is located between the upper and lower movable members.

7. A multiple spindle drilling machine for wide flange beams as set forth in claim 6 wherein sleeve liners are attached to both the upper and lower ends of the central stopper so that said sleeve liners bear against the upper and lower movable members, respectively, and the distance between the upper and lower drill rows can be adjusted according to the distance between the upper and lower movable members.

8. A multiple spindle drilling machine for wide flange beams as set forth in claim 7 wherein the respective sleeve liners are dismountably attached so that they can be replaced by other sleeve liners differing in the length.

9. A multiple spindle drilling machine for wide flange beams as set forth in claim 1 wherein said sensing means is arranged so that it bears against the surface of the web at a position just below the flanges of the wide flange beam.

* * * * *